United States Patent
Chew et al.

(10) Patent No.: US 6,593,949 B1
(45) Date of Patent: Jul. 15, 2003

(54) SMART COLUMN FOR CONTACT INFORMATION ON PALM-SIZED COMPUTING DEVICES AND METHOD AND APPARATUS FOR DISPLAYING THE SAME

(75) Inventors: Chee H. Chew, Redmond, WA (US); Elizabeth A. Bastiaanse, Cambridge, MA (US); Ido Ben-Shachar, Sammamish, WA (US); Jeffrey R. Blum, Seattle, WA (US); Mark H. Enomoto, Seattle, WA (US); Greg A. Keyser, Sammamish, WA (US); Kathryn L. Parker, Fall City, WA (US); Kevin T. Shields, Redmond, WA (US); Sarah E. Zuberec, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/564,515

(22) Filed: May 4, 2000

Related U.S. Application Data

(60) Provisional application No. 60/175,109, filed on Jan. 6, 2000.

(51) Int. Cl.[7] .............................................. G06F 3/00
(52) U.S. Cl. .................................... 345/841; 345/157
(58) Field of Search ................................ 345/157, 169, 345/173, 863, 762, 763, 764, 841

(56) References Cited

U.S. PATENT DOCUMENTS 6,269,369 B1 * 7/2001 Robertson .................... 709/203
6,404,884 B1 * 6/2002 Marvell et al. ............. 379/223

* cited by examiner

*Primary Examiner*—Cao (Kevin) Nguyen
(74) *Attorney, Agent, or Firm*—Westman, Champlin & Kelly, P.A.

(57) ABSTRACT

The UI of the present invention increases the number of contacts initially shown to the user of a hand-held device to aid the user in finding information in a Contacts database. While displaying a list of Contacts database entries, the UI displays a column which contains single letters indicating the type of information displayed for the names represented in the list of entries. A tap on a letter in that column causes a sub-list of other most commonly needed information to be deployed for the corresponding entry, potentially eliminating the need for the user to open the entire record for that entry.

19 Claims, 11 Drawing Sheets

SMART COLUMN FOR CONTACT INFORMATION ON PALM-SIZED COMPUTING DEVICES AND METHOD AND APPARATUS FOR DISPLAYING THE SAME

REFERENCE TO RELATED APPLICATION

The present application claims priority from U.S. Provisional Application serial No. 60/175,109, filed on Jan. 6, 2000 Expired and entitled "SMART COLUMN FOR CONTACT INFORMATION ON PALM-SIZED COMPUTING DEVICES AND METHOD AND APPARATUS FOR DISPLAYING THE SAME."

BACKGROUND OF THE INVENTION

The present invention relates to hand-held personal computing devices commonly known as hand-held devices or palm-sized devices. More particularly, the present invention relates to Contacts database user interfaces (UIs) for hand-held devices.

Hand-held devices are small electronic computing devices, sometimes also referred to as personal digital assistants (PDAs). Generally, these devices fit comfortably in the palm of a user's hand. Hand-held devices have gained a niche as personal organizers, allowing users to view or change lists of contacts, tasks or calendar events on a display using an interface device such as a keyboard (typically integrated into a touch sensitive display) and a stylus.

On a hand-held device, screen real estate is limited (both horizontally and vertically). As such, they are only able to display a portion of the information stored on them at any given time. For example, a typical Contacts database stored on a hand-held device has several hundred entries in it, with each entry including addresses, phone numbers and other information. Thus, there is a need for methods of efficiently accessing pertinent contact information on a limited size screen.

SUMMARY OF THE INVENTION

The present invention includes apparatus and methods for generating a Contacts information user interface (UI), for a stylus based hand held device, which maximizes the number of contacts initially shown to aid the user in finding the correct entry, and which provides a mechanism to efficiently retrieve the most commonly needed information for each contact entry. According to a first aspect of the invention, while displaying a list of Contacts database entries, the UI displays a column which contains single letters indicating the type of information displayed for the names represented in the list of entries. A tap on a letter in that column causes a sub-list of other commonly accessed information to be deployed for the corresponding entry, potentially eliminating the need for the user to open the entire record to retrieve desired information.

According to a second aspect of the present invention, a tap on the letter of the column results in truncated information displayed on the corresponding line of the list of entries to be displayed as fully as possible in the list of entries.

According to a third aspect of the present invention, a single tap on a row of the sub-list described above results in a change of displayed information on the corresponding row of the list of entries.

DETAILED DESCRIPTION OF ILLUSTRATIVE EMBODIMENTS

Figure 1:
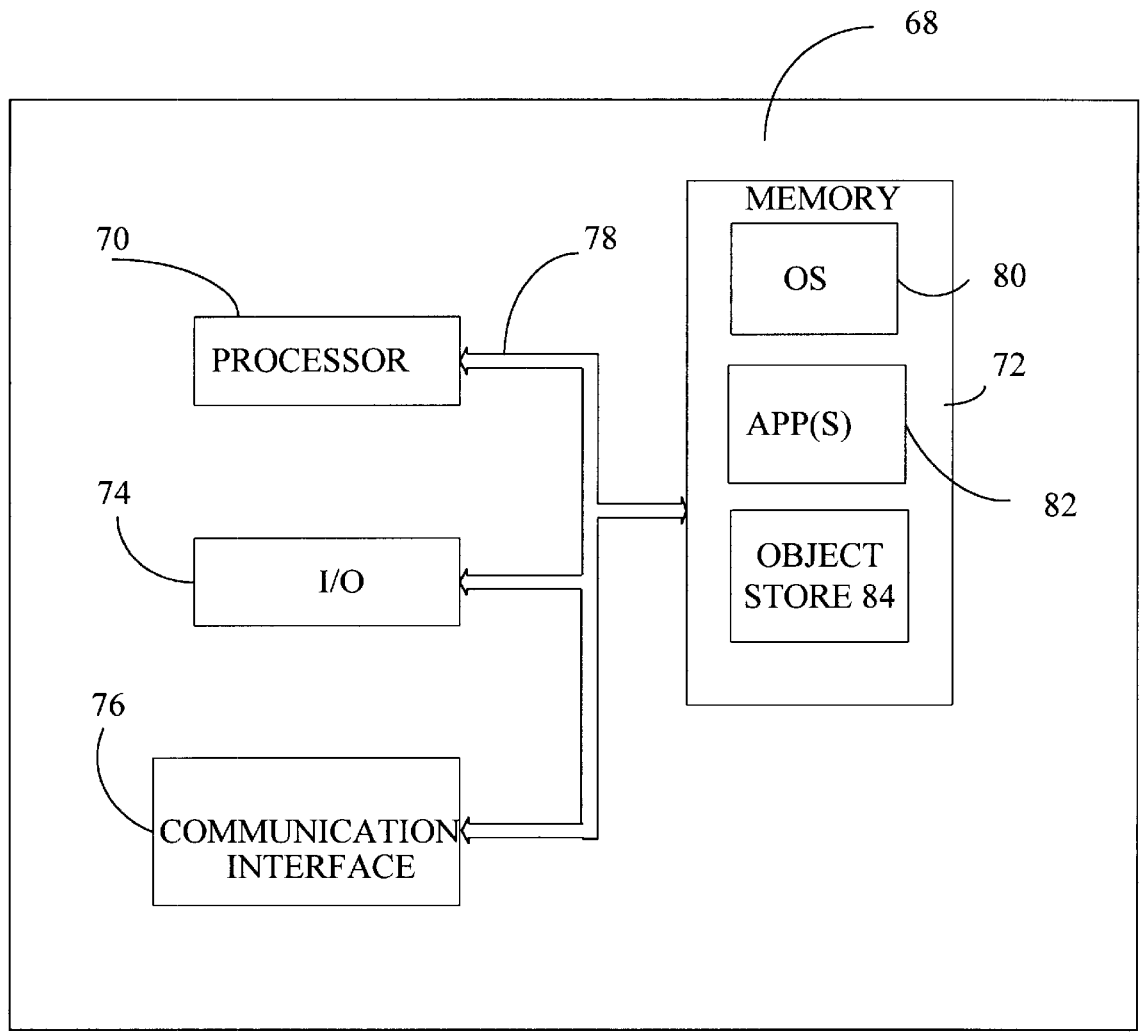
FIG. 1 is a block diagram of a hand-held device computing environment in which many embodiments of the present invention may be practiced.

FIG. 1 is a block diagram of a hand-held device 68, which is an exemplary computing environment for the present invention. Hand-held device 68 includes a microprocessor 70, memory 72, input/output (I/O) components 74, a communication interface 76 for communicating with, for example, a separate computer or hand-held device. In one embodiment, the aforementioned components are coupled for communication with one another over a suitable bus 78.

Memory 72 is implemented as non-volatile electronic memory such as random access memory (RAM) with a battery back-up module (not shown) such that information stored in memory 72 is not lost when the general power to mobile device 68 is shut down. A portion of memory 72 is preferably allocated as addressable memory for program execution, while another portion of memory 72 is preferably used for storage, such as to simulate storage on a disk drive.

Memory 72 includes an operating system 80, application programs 82 as well as an object store 84. During operation, operating system 80 is preferably executed by processor 70 from memory 72. Operating system 80, in one preferred embodiment, is a "WINDOWS CE" brand operating system commercially available from Microsoft Corporation, which is also known as Microsoft Windows for Pocket PC. Operating system 80 is preferably designed for hand-held devices, and implements database features that can be utilized by applications 82 through a set of exposed application programming interfaces and methods. The objects in object store 84 are maintained by applications 82 and operating system 80, at least partially in response to calls to the exposed application programming interfaces and methods.

Input/output components 74 can include, for example, input devices such as a keyboard, a mouse or other pointing device, touch sensitive display components, and control buttons. Input/output components 74 can also include output devices such as liquid crystal displays and speakers. Further, input/output components 74 include electronics and/or software associated with these devices or with other devices such as printers.

Communication interface 76 represents numerous devices and technologies that allow hand-held device 68 to send and receive information. The devices include wired and wireless modems, satellite receivers and broadcast tuners to name a few. In some embodiments, mobile device 68 can also be directly connected to a computer to exchange data therewith. In such cases, communication interface 76 can be an infrared transceiver or a serial or parallel communication connection, all of which are capable of transmitting streaming information. While communication interface 76 is included in various forms in many embodiments of the invention, communication interface 76 is optional is yet other embodiments if sending and receiving information is not required.

Figure 2:
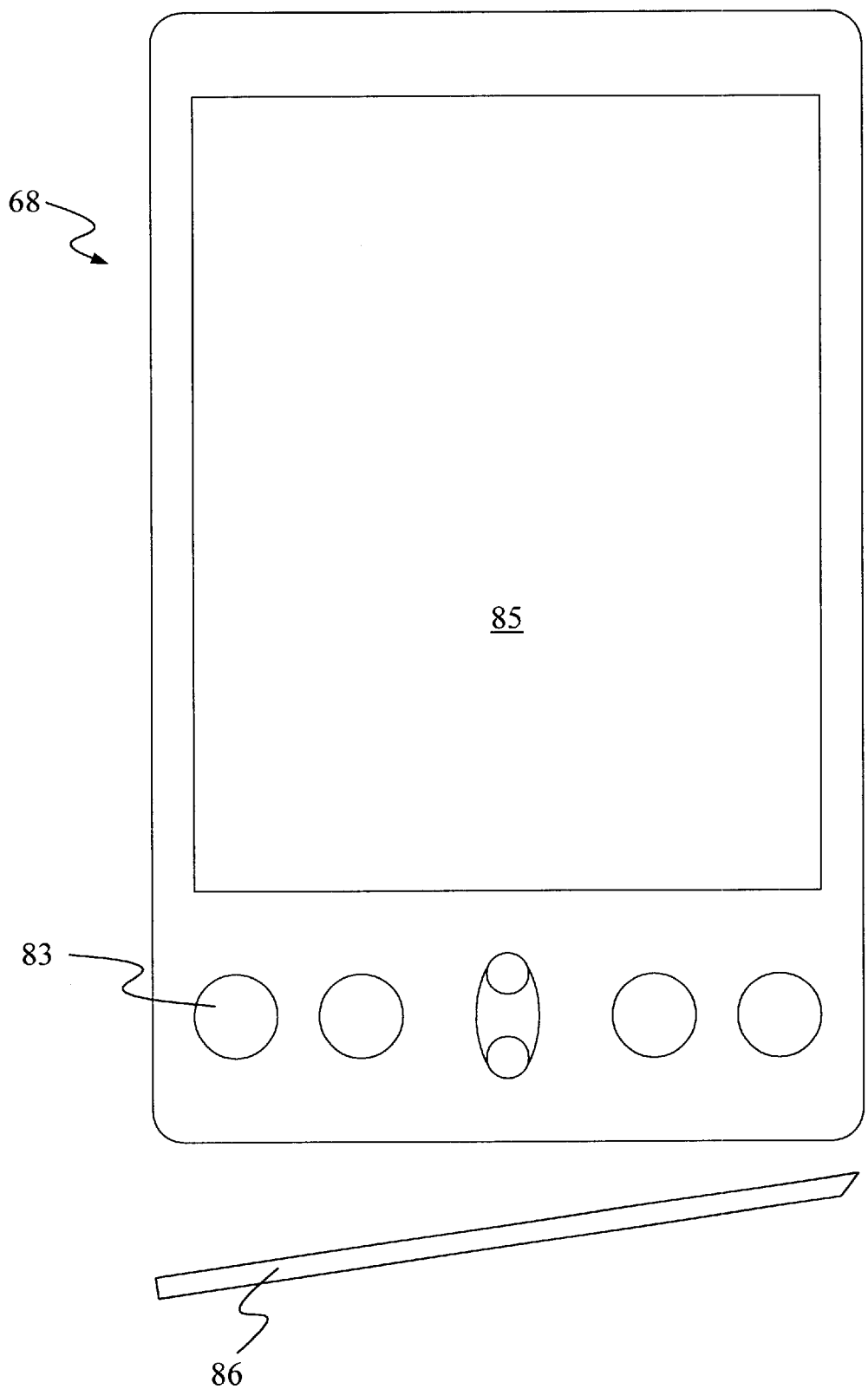
FIG. 2 is a front view of a hand-held computing device on which many embodiments of the present invention may be practiced.

FIG. 2 is a simplified pictorial illustration of device 68. Device 68 can be a desktop assistant sold under the designation H/PC or a palm-sized PC designated as P/PC or as Pocket PC having software provided by the Microsoft Corporation. In one embodiment, device 68 includes a set of control buttons 83, display 85 and stylus 86. In the embodiment shown in FIG. 2, display 85 is a liquid crystal display (LCD) which uses a contact sensitive display screen in conjunction with stylus 86. Stylus 86 is used to press or contact display 85 at designated coordinates to accomplish certain user input functions. In some embodiments, a miniaturized keyboard with alpha-numeric keys is provided with the mobile device. In other embodiments, a "soft" keyboard 92 accessible through a soft input panel (SIP) icon 90 provided through a contact sensitive display screen (shown in FIGS. 3–9). In yet other embodiments, a character recognition module is employed to recognize characters written on the contact sensitive display screen using stylus 86.

A problem on some conventional limited sized screen devices is that the user sometimes must trade off either seeing a long list of contacts or seeing the data for those contacts. If the user utilizes the full vertical space to list names (a typical record identifier), there's little room to show the data for each name. At most, for a vertically oriented palm-size device, the user may be able to see one entry (e.g., a phone number) for each record. To access more information in these conventional hand-held devices, the user would typically have to open the entire data record and find any other information. This process can be inefficient.

In some conventional hand-held device Contacts database UIs, the top portion (several lines of the display) is used to show common information (e.g., phone number, fax number, e-mail address, etc) for a selected record. Identifiers (typically names in Contacts databases) for the selected record and for several non-selected records are then typically listed one per line below this top portion. Using this type of UI, some vertical real estate is used to show the selected record information, and therefore fewer record identifiers or names are listed at a time on the display. It is also typically necessary to select the one record that the user cares about, meaning that the user can't visually scan for the information. Also, since this type of UI often includes only the record name or identifier on each line, considerable screen space on the right side of the list can be wasted.

The present invention includes a UI for efficiently accessing pertinent contact information on a limited size screen. This UI design maximizes the number of contacts shown initially to aid the user in finding the correct entry in an efficient and convenient manner. The UI of the present invention also provides a mechanism to efficiently retrieve the most commonly needed information for each contact entry.

Figure 3:
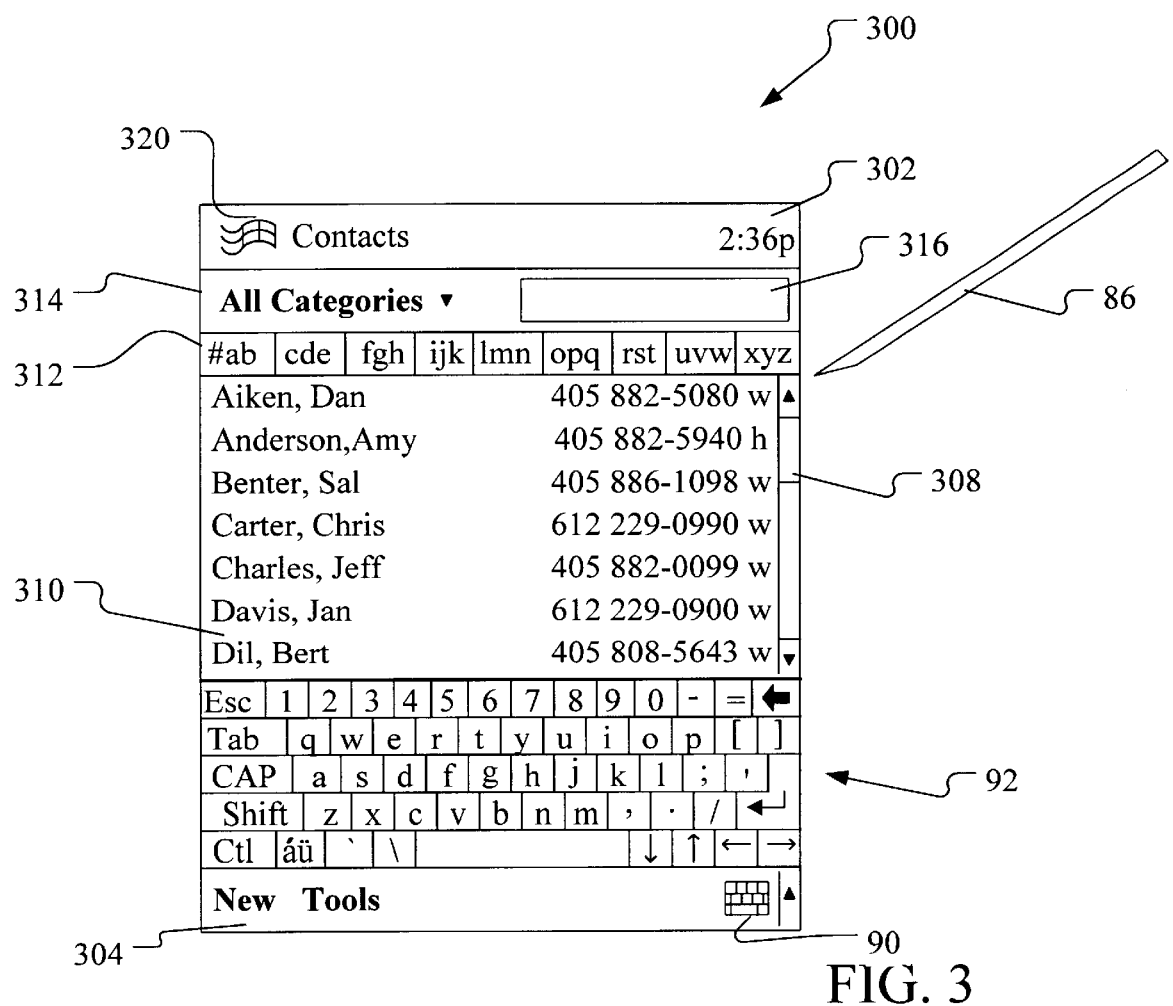
FIG. 3 is a screen-shot of a display showing a portion of a full Contacts list having a smart column in accordance with embodiments of the invention and showing a soft input panel.

FIGS. 3–9 illustrate features of a Contacts window or UI 300 that is shown on display 85 of FIG. 2 under various embodiments of the present invention. As shown in FIG. 3, Contacts window 300 includes a title bar 302 that indicates that this is the Contacts window and that provides a start menu icon 320. Window 300 also provides a menu bar 304, a soft input panel icon 90, a soft input panel 92, scroll bar 308, Contacts list 310, alphabetical contact navigation bar 312, Categories pull-down label 314 and edit control 316. By tapping the stylus 86 on the letters of soft input panel 92, the user is able to insert letters in edit control 316 to invoke a search algorithm to search a database of contacts. By tapping on soft input panel icon 90 with stylus 86, soft input panel 92 can be removed from view in window 300 to allow for additional screen real estate on which the Contacts list may be displayed. FIGS. 4–9 illustrate window 300 with soft input panel 92 removed from view.

Figure 4:
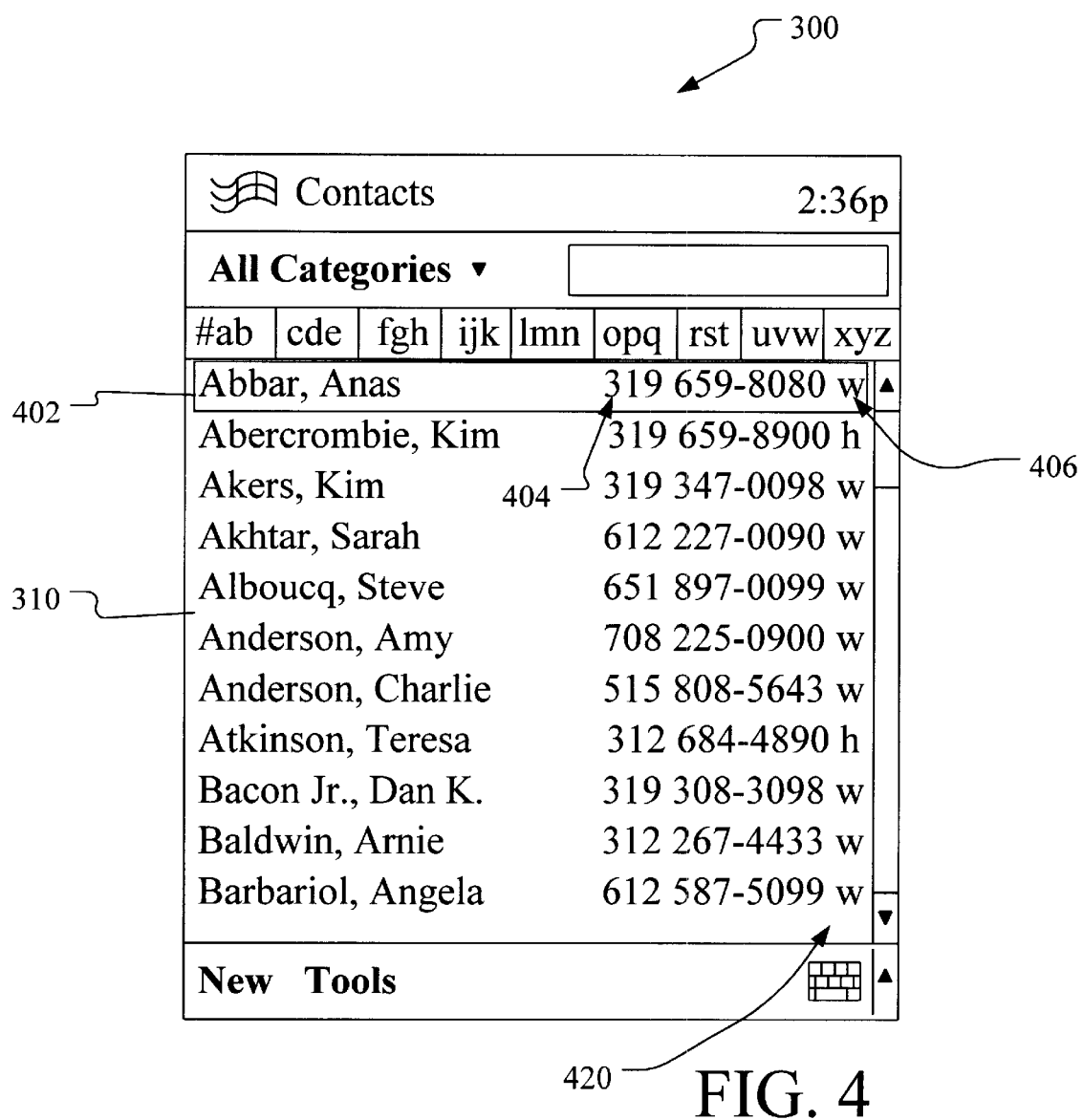
FIG. 4 is a screen-shot of a display showing a portion of a full Contacts list having a smart column in accordance with embodiments of the invention and showing the soft input panel removed from view.
Figure 5:
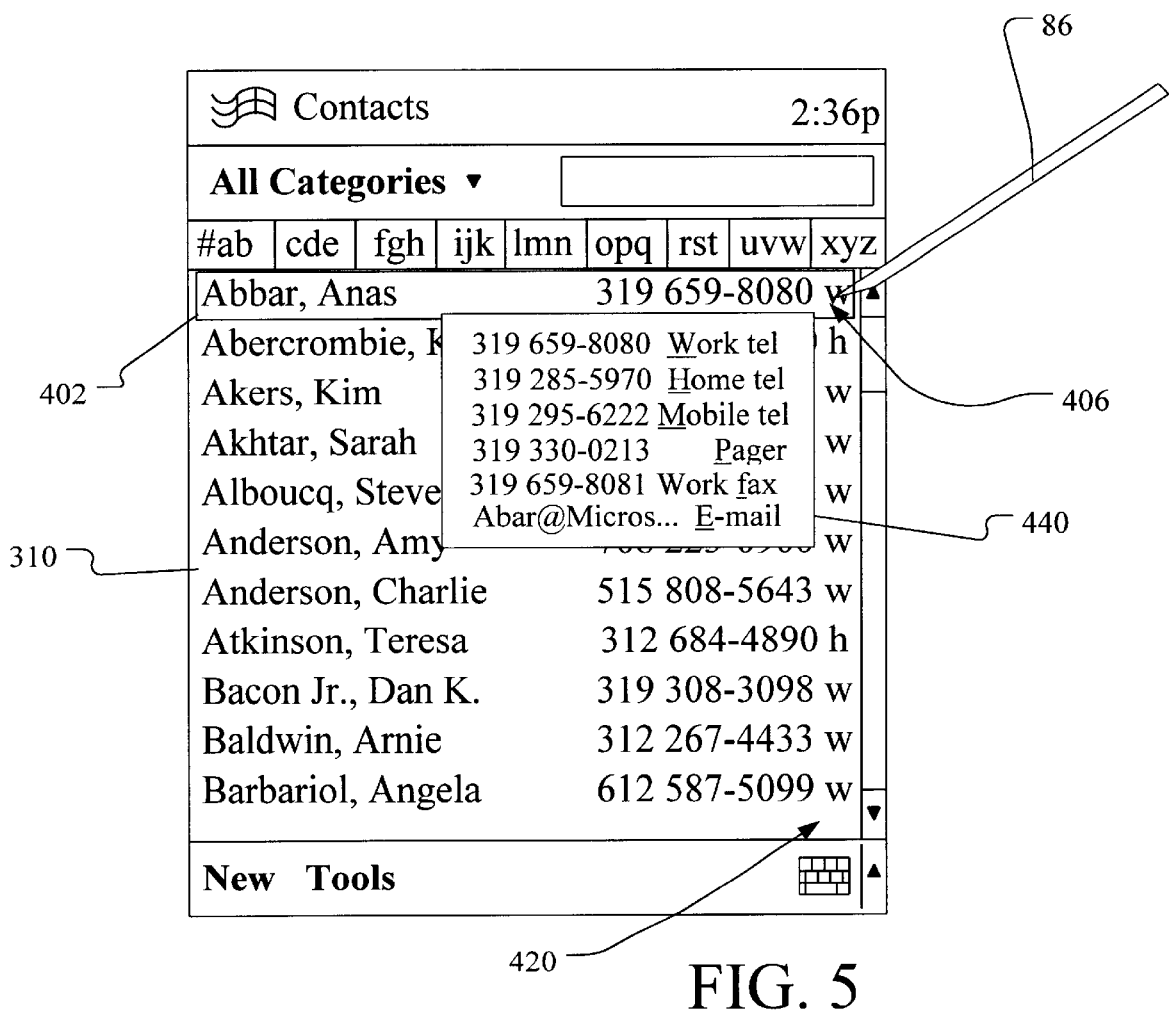
FIG. 5 is a screen-shot of a display showing the portion of the Contacts list of FIG. 4, but with a smart column sub-list deployed.

Referring now to FIG. 4, it can be seen that in window 300, Contacts list 310 is a vertically oriented list of contact names with a preset ordering of the most commonly accessed information type per entry. One such name entry is identified for illustrative purposes as entry or record 402. For entry 402, next to the record identification name "Abbar, Anas" is displayed the most commonly accessed information 404 corresponding to this contact. In this case, most commonly accessed information 404 is a work telephone number as indicated by indicator 406, which is in the example the letter "W". Indicator 406 of entry 402 and indicators of other entries in Contacts list 310 form a "smart column" 420 in accordance with aspects of the invention. The indicators (for example, 406) which form smart column 420 are each associated with the displayed most commonly accessed information (for example 404) in the adjacent column for the corresponding record.

There is provided a light weight mechanism to access the other most common data entries for a record, without opening the full data set. As mentioned above, information 404 and indicator 406 are determined according to a preferential order that is preset (e.g. cell number, work number, home number, email address, fax number) in priority order to determine what information will be displayed on each line for the corresponding entry. These items are filled in by default, according to the preset list, so that no entries are blank. Shown on each line is data for the name entry skipping the entry if that record is empty. Smart column 420 containing single unique letters on the far right edge indicates which of the data entries are being displayed for each particular entry.

A single tap (with the stylus) activating the contact entry in most of a row (for example a tap on the name or telephone number of entry 402) will open the entire data record. However, in some embodiments of the invention, a single tap on the one single character (for example letter 406 corresponding to entry 402) from the smart column 420 will drop or deploy a sub-list 440 (shown in FIG. 5) listing the other smart column candidate entries filled out for that data record. In other embodiments, a tap and hold gesture is used to deploy sub-list 440. In these embodiments, the user holds the stylus in place on a smart column character for a predetermined period of time. A predetermined amount of stylus movement can be allowed, while implementing a tap and hold gesture, to accommodate small unintentional stylus movements by the user. Once the stylus has been held in place for the predetermined period of time, the tap and hold gesture is recognized and sub-list 440 is deployed. In yet other embodiments, a double tap gesture is used to deploy the sub-list. Any of these gestures allow quick access to any of the most common data entries associated with a record without opening the data record. In some embodiments, the single letter or character is made to appear different from the remainder of the line to aid the user in identifying the smart column character as an item which can be activated distinctly from the rest of the listview items. For example, to ensure that the smart column characters are visually distinct on both black and white devices and color devices, the smart column characters can be made both bold and blue.

The far right column of the sub-list 440 indicates what information is shown in the other column (the numbers in this screen shot) corresponding to the data. In this UI design, the user is able to see more names total in Contacts list 310 at any given time, which makes scanning for data faster. The most common information for each contact record is shown in the sub-list so that, once the user finds the desired contact entry (e.g., record 402), it is not necessary to take any action beyond deploying the smart column sub-list.

Figure 6:
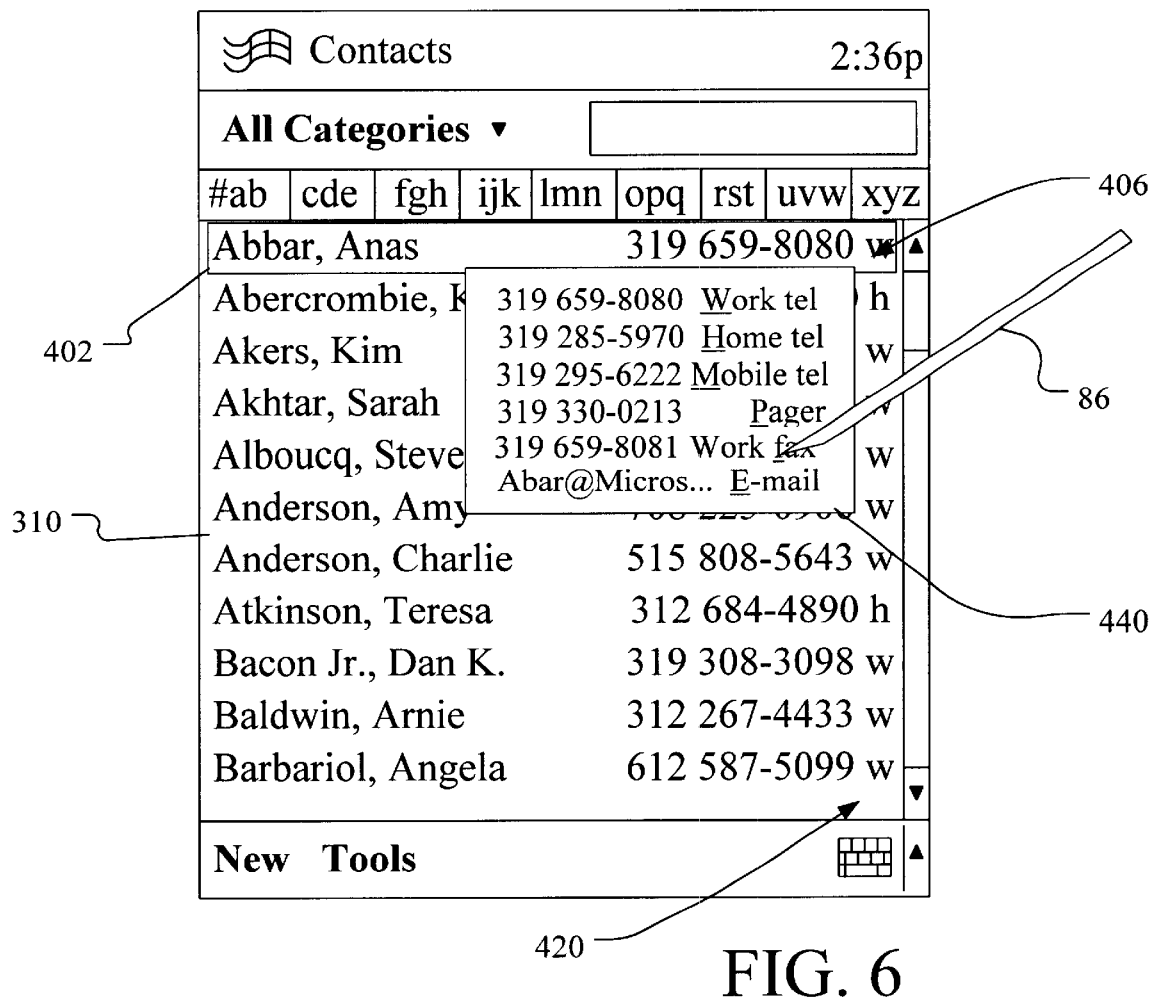
FIG. 6 is a screen-shot of the display shown in FIG. 5, which illustrates a method of changing smart column information.
Figure 7:
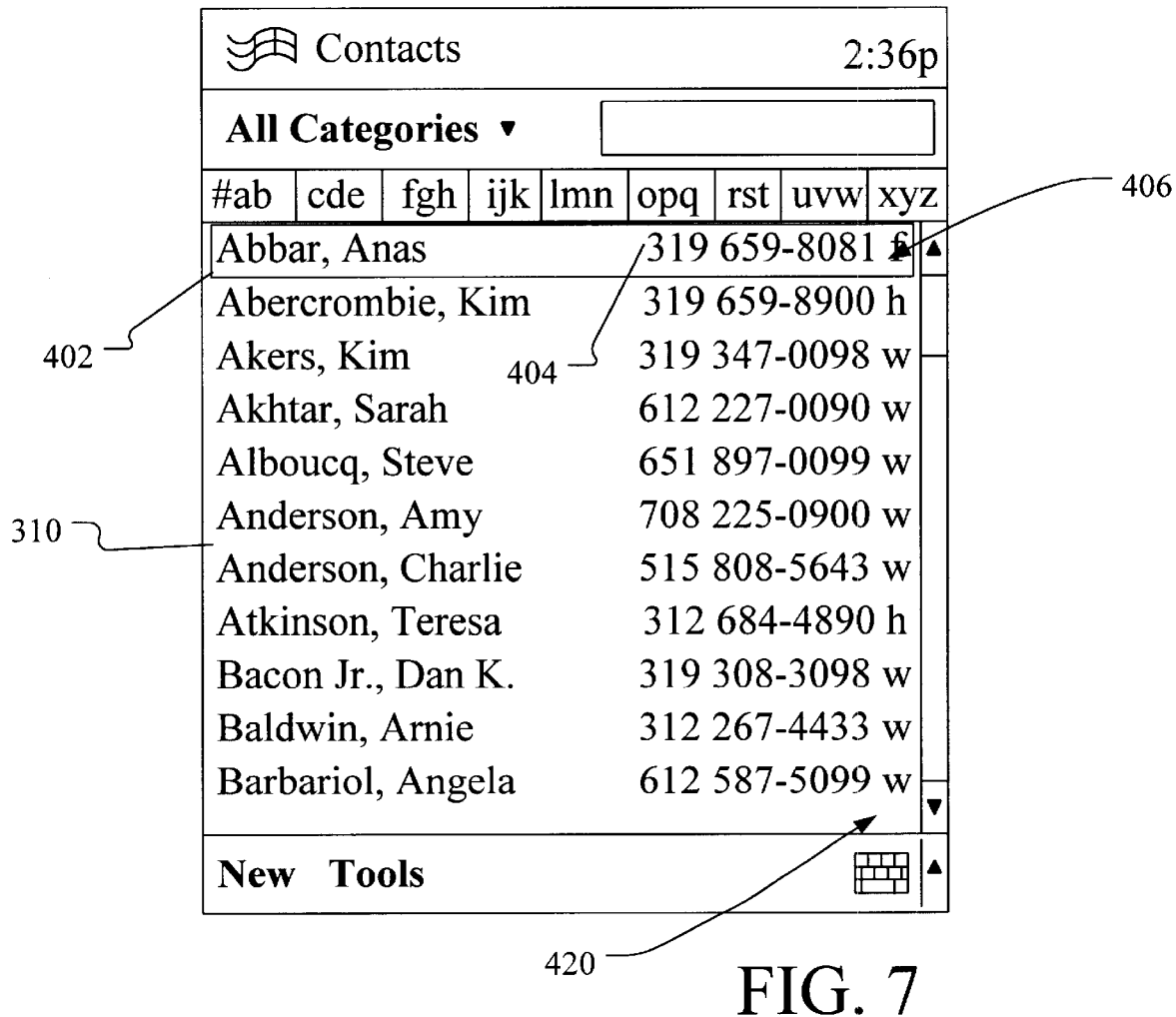
FIG. 7 is a screen-shot of a display showing the results of the change of smart column information implemented in FIG. 6.

As shown in FIGS. 6 and 7, using stylus 86 to select one of the other entries in sub-list 440 will cause that selected entry to become the preferred entry for that individual record. In FIG. 6, with the work telephone number being the preferred entry for record 402, stylus 86 is used to tap the "Work fax" line of sub-list 440. As shown in FIG. 7, this results in a change of preferred information 404 and in the indicator or letter 406 of smart column 420 corresponding to entry 402. This allows the user to intuitively make exceptions to the preference order for any particular person in the Contacts list database.

Due to horizontal screen constraints and the use of some horizontal space for smart column 420 and the associated preferred information, sometimes the right half of a name for a particular record is truncated. This is particularly true for long company names. The result may be that it is difficult to distinguish one entry from another. This can be seen for example in FIG. 8 in which the names in each of records 502 and 504 have been truncated. In this instance each of "American Express Customer Service" in record 502 and "American Express Travel Services" in record 504 have been truncated to "American Express."

Figure 9:
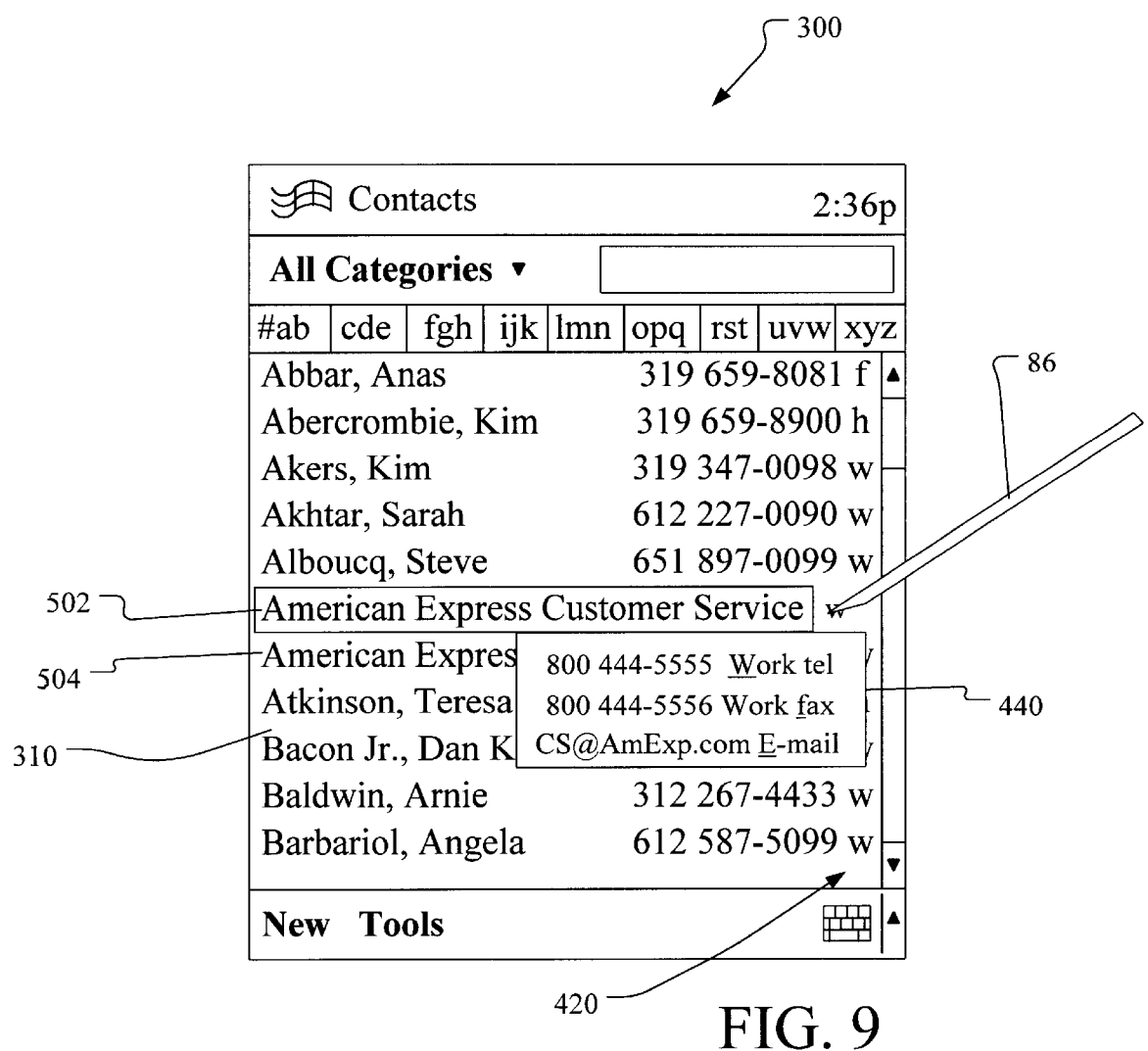

FIG. 9 illustrates a method used by the UI of the present invention to aid the user in this situation. For truncated name records, when the smart column sub-list 440 is deployed for record 502, the duplicate smart column information (e.g. phone number for American Express Customer Service) is removed from view because it is also available in the sub-list 440. This area is then used to as fully as possible show the previously truncated name on the line occupied by record 502.

Figure 10:
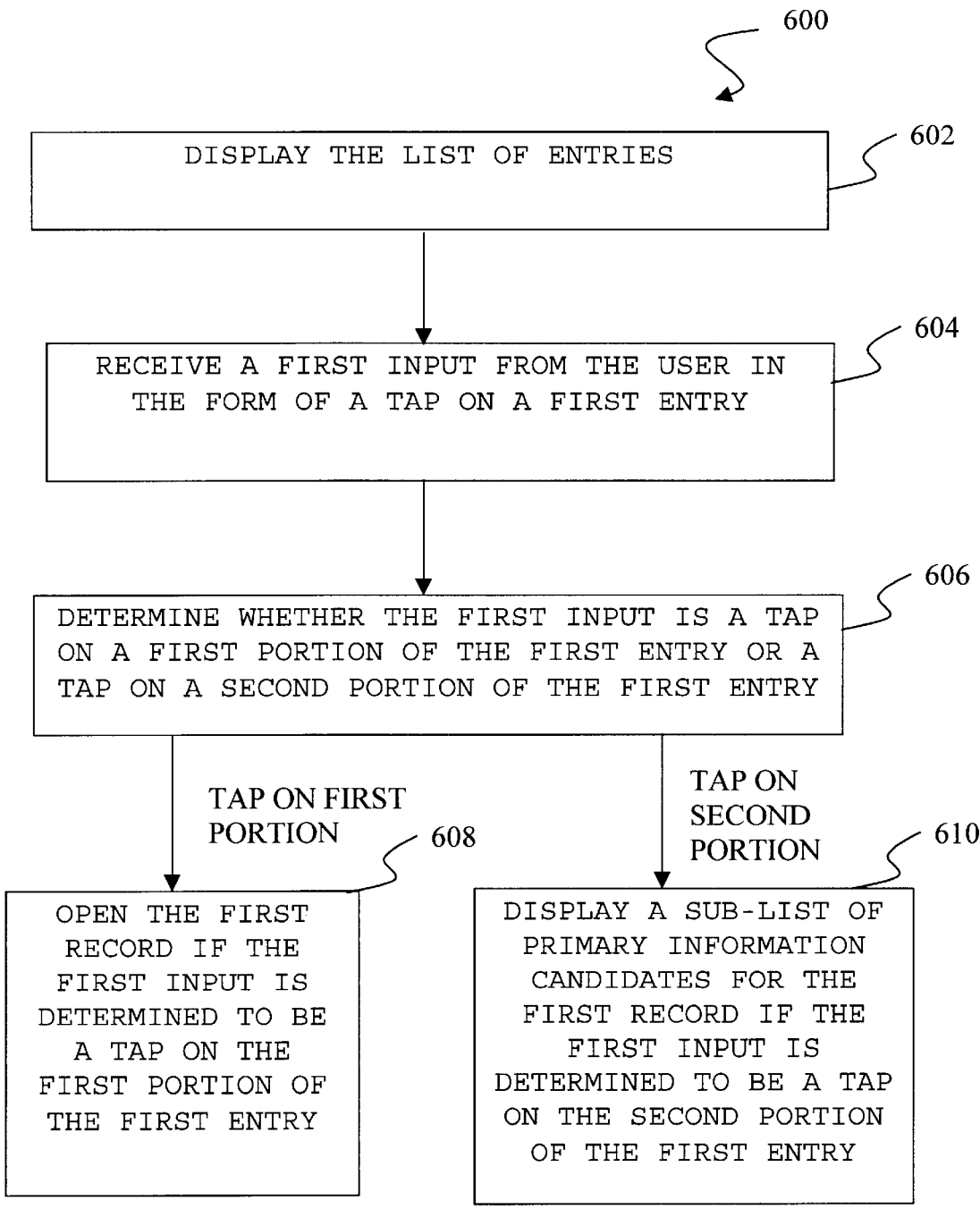
FIGS. 10 and 11 are flow diagrams illustrating methods of the present invention.
Figure 11:
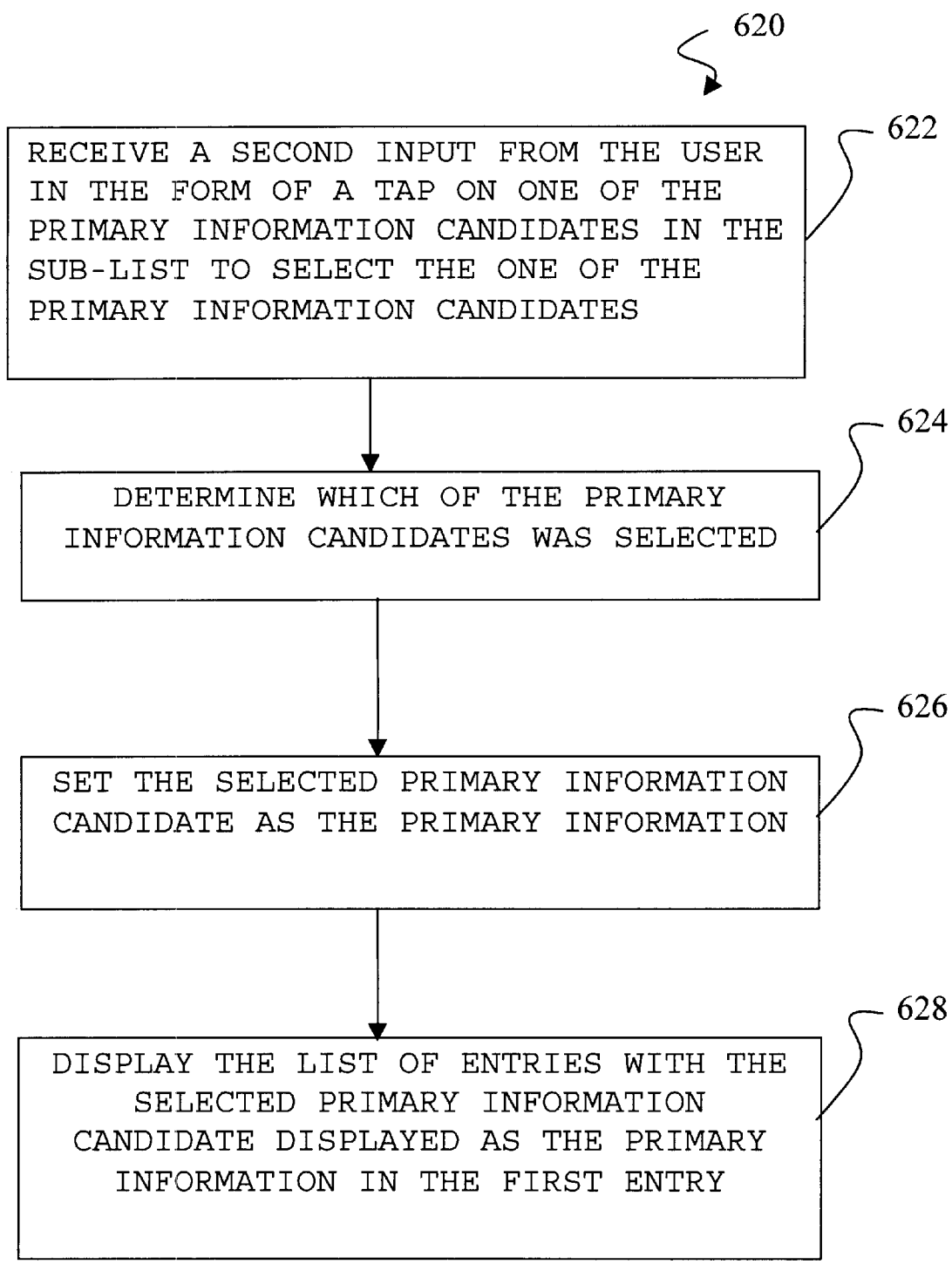

The methods of the present invention, which for example can be implemented using computer-executable instructions stored on a computer-readable medium for hand-held devices, are illustrated in the flow diagrams of FIGS. 10 and 11. These method steps are further supported by the illustrations of FIGS. 4–9 discussed above. Referring to method 600 in FIG. 10, shown at block 602 is the step of displaying a list 310 of entries. As discussed above, each entry (for example entry 402) represents a record in the Contacts database, and includes a record identifier (typically a name) for the corresponding record, primary information 404 for the corresponding record, and an indicator 406 which identifies a type for the primary information. Typically, each entry will occupy one line of the display.

At block 604, shown is the step of receiving a first input from the user in the form of a tap on a first entry (for example entry 402) in the displayed list 310 of entries. At block 606, shown is the step of determining whether the first input is a tap on a first portion of the first entry or a tap on a second portion of the first entry. In some embodiments, the first portion of the first entry includes portions of the display in which the name (or other record identifier) and the primary information 404 are displayed. In these same embodiments, the second portion of the first entry includes portions of the display in which the indicator 406 of the first entry is displayed.

In the step illustrated at block 608, the first record is opened if the first input is determined to be a tap on the first portion of the first entry. In the alternative step illustrated at block 610, sub-list 440 of primary information candidates for the first record is displayed if the first input is determined to be a tap on the second portion of the first entry. In this manner, the user can conveniently access the entire record, or just a sub-list of most commonly accessed information types for the record.

Figure 8:
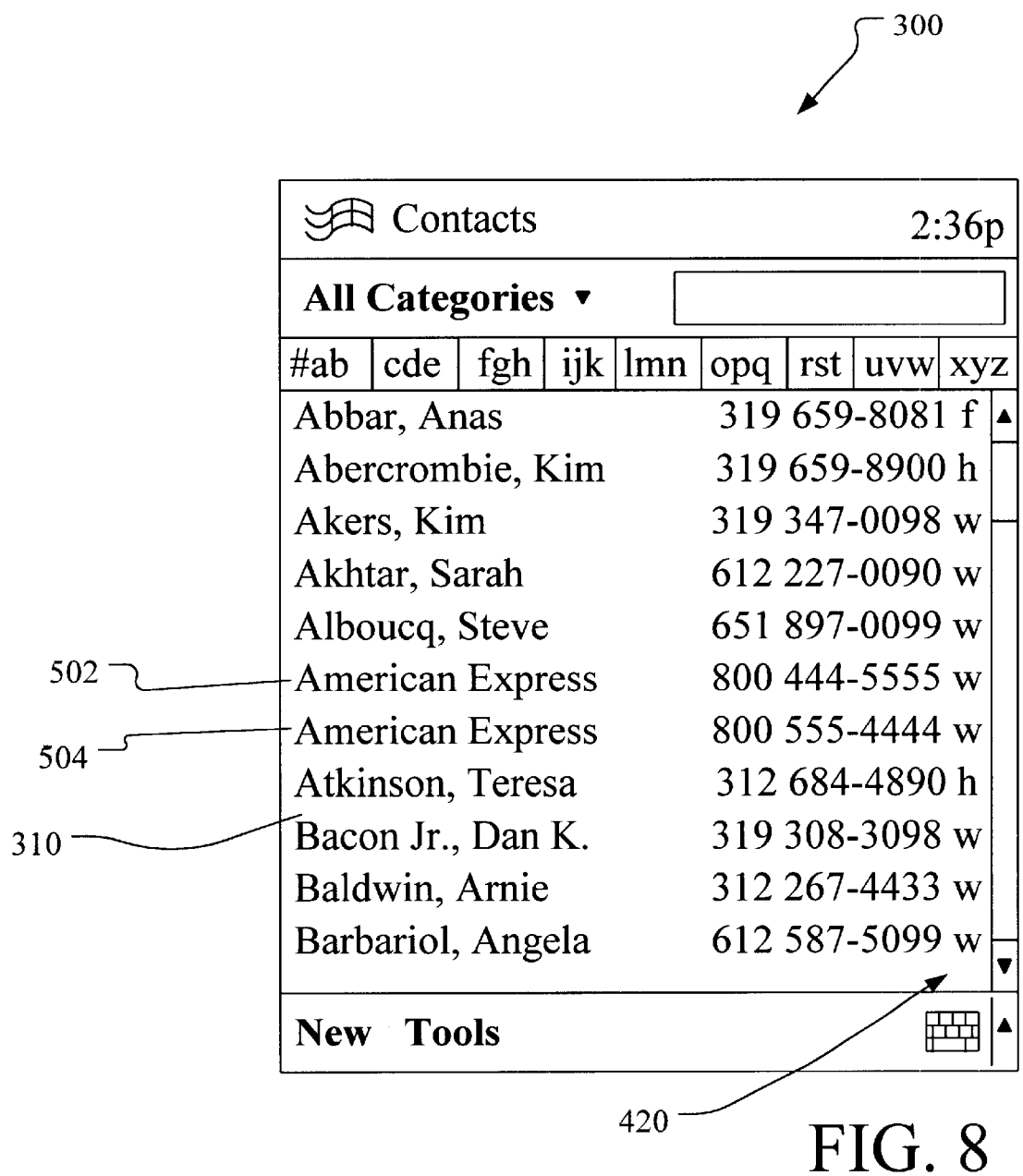
FIGS. 8 and 9 are screen-shots of a display showing a feature of the invention in which truncated names in the Contacts list are shown more fully upon deployment of a smart column sub-list.

In some embodiments of the invention, while the sub-list 440 is displayed, one or more other entries in list 310 are still displayed to thereby maximize the information available to the user. A further embodiment can be used when the name of the record is truncated prior to deployment of the sub-list of primary information candidates as shown in FIG. 8. In this embodiment, upon deployment of sub-list 440, the name is shown as fully as possible in the main entry line 502 as illustrated in FIG. 9.

FIG. 11 illustrates additional more particular steps which can be implemented if the first input is determined to be a tap on the second portion of the first entry, resulting in the deployment of a sub-list 440. The effects of these steps are illustrated in FIGS. 6 and 7 discussed above. In accordance with further method 620 of the present invention illustrated in FIG. 11, as shown at block 622, after deployment of the sub-list a second input from the user can be received. The second input can be in the form of a second tap on one of the primary information candidates in sub-list 440, thereby selecting the one of the primary information candidates. Next, as illustrated at block 624, a determination is made as to which of the primary information candidates was selected. Then, at the step of block 626, the selected primary information candidate is set as the new primary information 404. Finally, at step 628, the list 310 of entries is displayed with the selected primary information candidate being displayed as the new primary information 404 in conjunction with the entry name and with indicator 406 which is updated to identify a type for the new primary information candidate.

In summary, the present inventors have recognized that improvement is needed in the User Interface (UI) surrounding the Contacts information on a hand-held device. Specifically, in a palm-size computing device, improvement is needed in the UI mechanisms for displaying Contacts information to better utilize the limited available screen real estate. To address this need, the present invention includes apparatus and methods for generating a Contacts information UI, for a stylus based hand held device, which maximizes the number of contacts initially shown to aid the user in finding the correct entry, and which provides a mechanism to efficiently retrieve the most commonly needed information for each contact entry.

According to a first aspect of the present invention, the UI displays a column 420 of a high level list 310 which contains single letters indicating the type of information displayed for the contacts represented by the corresponding rows in the high level list. A tap on a letter in that column causes a sub-list 440 to be displayed for the corresponding row in the high level list, while at least some of the remaining rows of the high level list continue to be displayed.

According to a second aspect of the present invention, a tap on the letter of the column results in truncated information displayed on the corresponding line of the high level list to be displayed in full in the high level list or in the sub-list.

According to a third aspect of the present invention, a single tap on a row of the sub-list described above results in a change of displayed information on the corresponding row of the high level list.

Although the present invention has been described with reference to particular embodiments, workers skilled in the art will recognize that changes may be made in form and detail without departing from the spirit and scope of the invention.

What is claimed is:

1. A method of generating a Contacts database user interface on a stylus-based computing device having a display and a stylus for providing input to the display, the method comprising:

displaying a list of entries with each entry representing a record in the Contacts database, wherein each entry in the list of entries includes a record identifier for a corresponding record, primary information for the corresponding record, and an indicator which identifies a type for the primary information for the corresponding record;

receiving a first input from the user in the form of a tap on a first entry in the displayed list of entries corresponding to a first record;

determining whether the first input is a tap on a first portion of the first entry or a tap on a second portion of the first entry;

opening the first record if the first input is determined to be a tap on the first portion of the first entry; and displaying a sub-list of primary information candidates for the first record if the first input is determined to be a tap on the second portion of the first entry.

2. The method of claim 1, wherein if the first input is determined to be a tap on the second portion of the first entry, further comprising:

receiving a second input from the user in the form of a second tap on one of the primary information candidates in the sub-list thereby selecting the one of the primary information candidates;

determining which of the primary information candidates was selected;

setting the selected primary information candidate as the primary information; and displaying the list of entries with the selected primary information candidate being displayed as the primary information in conjunction with the first entry record identifier and with an indicator which identifies a type for the selected primary information candidate.

3. The method of claim 1, wherein displaying the list of entries includes displaying the list of entries with each entry including a name as the record identifier.

4. The method of claim 3, wherein displaying the list of entries further includes displaying each particular entry in the list of entries such that the name, the primary information and the indicator for the particular entry are displayed on a single line.

5. The method of claim 3, wherein the primary information candidates displayed in the sub-list are information types chosen from a list of information types consisting of telephone numbers, pager numbers, electronic mail addresses, and facsimile machine numbers.

6. The method of claim 1, wherein the indicator for the displayed primary information for each entry in the list of entries comprises a single letter which identifies the type of the primary information for the entry.

7. The method of claim 1, wherein the first portion of the first entry includes portions of the display in which the record identifier and the primary information of the first entry are displayed such that if it is determined that the first input is a tap on either of the record identifier or the primary information of the first entry, then the first record is opened.

8. The method of claim 7, wherein the second portion of the first entry includes portions of the display in which the indicator of the first entry is displayed such that if it is determined that the first input is a tap on the indicator of the first entry, then the sub-list of primary information candidates for the first record is displayed.

9. The method of claim 1, wherein displaying the sub-list of primary information candidates for the first record further comprises displaying the sub-list while still displaying at least one entry in the list of entries.

10. The method of claim 1, wherein prior to the sub-list of primary information candidates for the first record being displayed, a first line displays the name, the primary information and the indicator of the first entry, and wherein if the name of the first entry is truncated in the first line prior to the sub-list being displayed, then while the sub-list is displayed further comprising displaying the name as fully as possible on the first line using portions of the first line on which the primary information and the indicator were previously displayed.

11. The method of claim 1, wherein receiving the first input further comprises receiving the first input in the form of a tap and hold gesture on the first entry in the displayed list of entries corresponding to the first record.

12. A computer-readable medium for a stylus-based handheld device having a display and a stylus for providing an input to the display, the computer-readable medium having computer-executable instructions for performing steps comprising:

displaying a list of entries with each entry representing a record in a Contacts database, wherein each entry in the list of entries includes a record identifier for a corresponding record, primary information for the corresponding record, and an indicator which identifies a type for the primary information for the corresponding record;

receiving a first input from the user in the form of a tap on a first entry in the displayed list of entries corresponding to a first record;

determining whether the first input is a tap on a first portion of the first entry or a tap on a second portion of the first entry;

opening the first record if the first input is determined to be a tap on the first portion of the first entry; and displaying a sub-list of primary information candidates for the first record if the first input is determined to be a tap on the second portion of the first entry.

13. The computer-readable medium of claim 12, wherein if the first input is determined to be a tap on the second portion of the first entry, further including computer-executable instructions for performing steps comprising:

receiving a second input from the user in the form of a second tap on one of the primary information candidates in the sub-list thereby selecting the one of the primary information candidates;

determining which of the primary information candidates was selected;

setting the selected primary information candidate as the primary information; and displaying the list of entries with the selected primary information candidate being displayed as the primary information in conjunction with the first entry record identifier and with an indicator which identifies a type for the selected primary information candidate.

14. The computer readable medium of claim 12, wherein displaying the list of entries includes displaying the list of entries with each entry including a name as the record identifier.

15. The computer readable medium of claim 12, wherein the indicator for the displayed primary information for each entry in the list of entries comprises a single letter which identifies the type of the primary information for the entry.

16. The computer readable medium of claim 12, wherein the first portion of the first entry includes portions of the display in which the record identifier and the primary information of the first entry are displayed such that if it is determined that the first input is a tap on either of the record identifier or the primary information of the first entry, then the first record is opened.

17. The computer readable medium of claim 12, wherein the second portion of the first entry includes portions of the display in which the indicator of the first entry is displayed such that if it is determined that the first input is a tap on the indicator of the first entry, then the sub-list of primary information candidates for the first record is displayed.

18. The computer readable medium of claim 12, wherein displaying the sub-list of primary information candidates for the first record further comprises displaying the sub-list while still displaying at least one entry in the list of entries.

19. The computer readable medium of claim 12, wherein prior to the sub-list of primary information candidates for the first record being displayed, a first line displays the name, the primary information and the indicator of the first entry, and wherein if the name of the first entry is truncated in the first line prior to the sub-list being displayed, then while the sub-list is displayed further comprising displaying the name as fully as possible on the first line using portions of the first line on which the primary information and the indicator were previously displayed.

* * * * *